US012794311B2

(12) United States Patent
Jiang et al.

(10) Patent No.: US 12,794,311 B2
(45) Date of Patent: Nov. 10, 2026

(54) CURTAIN MOTOR

(71) Applicant: NINGBO SUNFREE MOTOR TECHNOLOGY COMPANY LIMITED, Ningbo City (CN)

(72) Inventors: Chun Jiang, Ningbo City (CN); Jianhong Wei, Ningbo City (CN)

(73) Assignee: NINGBO SUNFREE MOTOR TECHNOLOGY COMPANY LIMITED, Ningbo City (CN)

(*) Notice: Subject to any disclaimer, the term of this patent is extended or adjusted under 35 U.S.C. 154(b) by 195 days.

(21) Appl. No.: 18/757,892

(22) Filed: Jun. 28, 2024

(65) Prior Publication Data

US 2025/0015665 A1 Jan. 9, 2025

(30) Foreign Application Priority Data

Jul. 6, 2023 (CN) ......................... 202321772642.4

(51) Int. Cl.
*H02K 5/22* (2006.01)
*H02K 11/215* (2016.01)

(52) U.S. Cl.
CPC ........... *H02K 5/225* (2013.01); *H02K 11/215* (2016.01); *H02K 2207/03* (2013.01); *H02K 2211/03* (2013.01)

(58) Field of Classification Search
CPC .. H02K 5/225; H02K 11/215; H02K 2207/03; H02K 2211/03; H02K 7/116; H02K 11/33
USPC ........................................................ 310/68 R
See application file for complete search history.

(56) References Cited

U.S. PATENT DOCUMENTS

2021/0401213 A1* 12/2021 Wang ....................... A47H 5/02
2022/0228436 A1* 7/2022 Jiang ...................... H02K 7/003
2025/0015665 A1* 1/2025 Jiang ...................... H02K 11/33
2025/0331670 A1* 10/2025 Tan ........................ A47H 1/122

FOREIGN PATENT DOCUMENTS

CN 113285547 * 8/2021
CN 219229584 * 6/2023

* cited by examiner

*Primary Examiner* — Ahmed Elnakib
(74) *Attorney, Agent, or Firm* — Juan Carlos A. Marquez; Marquez IP Law Office, PLLC

(57) ABSTRACT

A curtain motor is provided which comprises a housing and a motor core, a speed reducer and a circuit board are disposed in the housing; the motor core is fixedly connected to the speed reducer, and also electrically connected to the circuit board, wherein a through hole used for an output end of the speed reducer to transmit power is opened at an end of the housing; a support in communication with the through hole is integrally formed inside this end of the housing; the support is connected with the output end of the speed reducer; a bracket is further disposed in the housing, and one end of the bracket is connected with the motor core and the other end is connected with the circuit board. The motor core and the circuit board are assembled by the bracket to increase the assembling efficiency and lower the production costs.

9 Claims, 4 Drawing Sheets

CURTAIN MOTOR

This application is based upon and claims priority to Chinese Patent Application No. 202321772642.4, filed on Jul. 6, 2023, the entire contents of which are incorporated herein by reference.

TECHNICAL FIELD

The present disclosure relates to the field of motor technologies, and in particular to a curtain motor.

BACKGROUND

Generally, a curtain motor has a small volume and can be mounted in a curtain track. The curtain motor comprises a housing in which a motor core, a speed reducer and a circuit board are disposed. The motor core is fixedly connected with the speed reducer, and a tail end of the motor core and an output end of the speed reducer are each provided with a support. Thus, the motor core and the speed reducer can be stably connected with the housing, so as to enable the motor to output power stably. However, this structure is connected with two supports, leading to cumbersome assembling, more parts, lower production efficiency and higher costs.

SUMMARY

For the above technical problems in the prior arts, the present disclosure provides a curtain motor which can be assembled with fewer parts quickly with higher production efficiency.

In order to solve the above technical problems, the present disclosure employs the following technical solution: there is provided a curtain motor, which comprises a housing. A motor core, a speed reducer and a circuit board are disposed in the housing. The motor core is fixedly connected to the speed reducer, and also electrically connected to the circuit board. A through hole used for an output end of the speed reducer to transmit power is opened at an end of the housing. A support in communication with the through hole is integrally formed inside this end of the housing. The support is connected with the output end of the speed reducer. A bracket is further disposed in the housing, where one end of the bracket is connected with the motor core and the other end is connected with the circuit board.

Furthermore, the housing comprises a front housing and a rear cover. The rear cover is fitted to the front housing. One part of the bracket is located in the front housing and the other part is located in the rear cover. The through hole is located at an end of the front housing away from the rear cover. Reinforcing ribs integrally formed with the support are disposed at an inner side of the end of the front housing away from the rear cover. The reinforcing ribs are disposed along a periphery of the support.

Furthermore, a first chamber for mounting the motor core and a second chamber for mounting the circuit board are disposed on the bracket. The first chamber is in communication with the second chamber. A window is opened between the first chamber and the second chamber on the bracket.

Furthermore, the first chamber matches in shape with the motor core; a first fitting groove and a second fitting groove are symmetrically disposed in the second chamber to insert the circuit board. A maximal width of the second chamber is greater than a maximal width of the first chamber.

Furthermore, at least one positioning rib is disposed on each of four outer surfaces of the second chamber on the bracket. The positioning ribs are disposed along a length direction of the bracket. An inclined guide surface is disposed at an end of the positioning ribs close to the first chamber.

Furthermore, one circular step surface is disposed at a position of the rear cover connected with the front housing. An outer circumferential surface of the step surface is attached to an inner circumferential surface of the front housing. An end of the step surface is abutted against an end of the positioning ribs away from the first chamber.

Furthermore, an end of the first chamber away from the second chamber is abutted against a connection position of the motor core and the speed reducer, and an end of the output end of the speed reducer is abutted against an inner side of an end of the front housing away from the rear cover.

Furthermore, a front end of the circuit board is inserted into the second chamber and welded to the positive and negative poles of the tail end of the motor core; the front end of the circuit board is abutted against a connection position between the second chamber and the first chamber; a tail end of the circuit board is abutted against an inner side of an end of the rear cover away from the front housing.

Furthermore, a signal magnet is disposed at the tail end of the motor core and located between the positive and negative poles; a notch for avoiding the signal magnet is disposed at the front end of the circuit board, and a Hall sensor is disposed close to the signal magnet at the front end of the circuit board.

Furthermore, a press key and a line-running hole are disposed on the rear cover; a setting key corresponding to the press key and an antenna and a power line both corresponding to the line-running hole are disposed on the circuit board; the press key is located on the top surface of the rear cover, and the line-running hole penetrates through the top surface and the end surface of the rear cover.

Compared with the prior arts, the present disclosure has the following advantages: in the present disclosure, the support and the housing are integrally formed, that is, the two parts are combined into one part, reducing the assembling work of the parts and improving the assembling efficiency without losing any parts. In addition, the integrally-formed structure is sturdier than the assembled structure and the integrity of the parts will be better. In this way, the assembling steps can be reduced, and abnormal sound generated by unstable assembling between the parts can be avoided. In this case, the entire use of the curtain motor can be improved and the power output of the curtain motor can be stabilized. Furthermore, when the motor core and the circuit board are assembled by the bracket, the step of screwing with auxiliary tools can be saved, reducing the time and labor, increasing the assembling efficiency and lowering the production costs.

BRIEF DESCRIPTION OF THE DRAWINGS

In order to describe the technical solutions in the embodiments of the present disclosure or in the prior art more clearly, brief descriptions will be made below to the accompanying drawings involved in descriptions of the embodiments or the prior art. Obviously, the accompanying drawings are merely illustrative, and other drawings may also be obtained by those skilled in the art based on these drawings without carrying out creative work.

The structures, scales, sizes and the like depicted in the specification are only used by those skilled in the art to know and read the contents disclosed by the specification rather than to limit the embodiments of the present disclosure. Therefore, the structures, scales, sizes and the like do not have technically substantive meanings. Any modification, changes or adjustment to the structures, the scales and sizes shall all fall within the scope of protection covered by the technical contents disclosed by the present disclosure without affecting the effects and the purposes achieved by the present disclosure.

Figure 1:
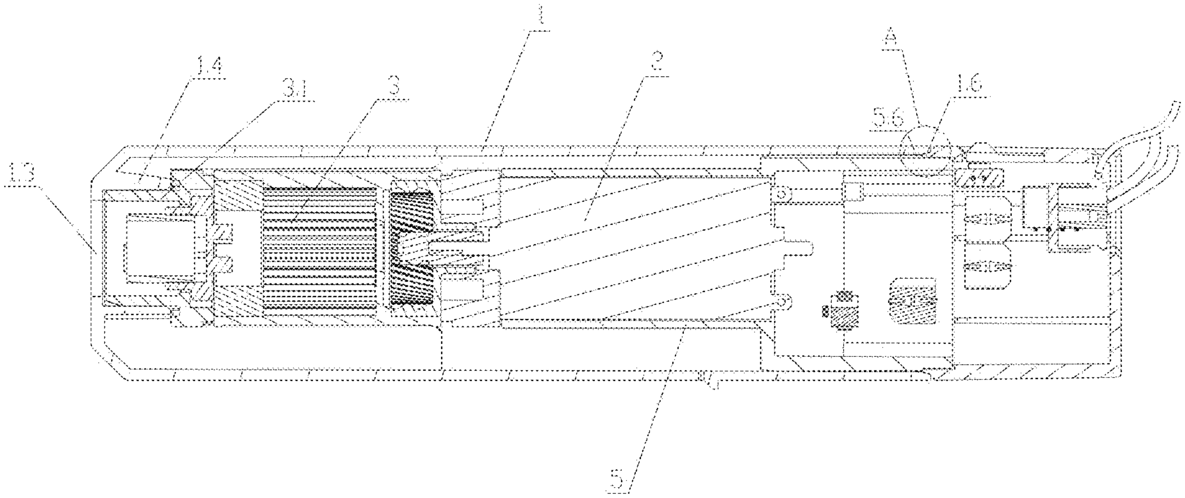
FIG. 1 is a sectional view of the present disclosure.

The numerals of the drawings are described below: 1. housing, 1.1 front housing, 1.2 rear cover, 1.3 through hole, 1.4 support, 1.5 reinforcing rib, 1.6 step surface, 1.7 press key, 1.8 line-running hole, 2. motor core, 2.1 signal magnet, 3. speed reducer, 3.1 output end, 4. circuit board, 4.1 notch, 4.2 Hall sensor, 4.3 setting key, 4.4 antenna, 4.5 power line, 5. bracket, 5.1 first chamber, 5.2 second chamber, 5.3 window, 5.4 first fitting groove, 5.5 second fitting groove, 5.6 positioning rib, 5.7 inclined guide surface.

DETAILED DESCRIPTIONS OF EMBODIMENTS

The present disclosure will be further described below with specific embodiments.

In the descriptions of the present disclosure, it is understood that orientation or positional relationship indicated by the terms such as "central", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", and "circumferential" is used only for ease of descriptions and simplification of descriptions and does not indicate or imply that the indicated devices or elements must have a particular orientation, or be constructed or operated in a particular orientation. Therefore, such terms shall not be understood as limiting of the present disclosure.

Further, the terms "first" and "second" are used for descriptions only and shall not be understood as indicating or implying relative importance or implicitly indicating the number of the indicated technical features. As a result, the features defined by the "first" and "second" may explicitly or implicitly include at least one feature. In the descriptions of the present disclosure, "plural" means at least two, for example, two or three or the like, unless otherwise clearly stated.

In the present disclosure, unless otherwise clearly stated or defined, the terms "mount", "connect", "couple", and "fix" and the like shall be understood in a broad sense, for example, may be fixed connection, or detachable connection, or formed into one piece; or may be mechanical connection, or electrical connection; or direct connection or indirect connection through an intermediate medium, or may be internal communication between two elements or mutual interaction of two elements, unless otherwise stated. Those skilled in the art may understand the specific meanings of the above terms in the present disclosure according to actual situations.

In the present disclosure, unless otherwise clearly stated or defined, the first feature being "on" or "below" the second feature refers to that the first feature and the second feature are in direct contact, or the first feature and the second feature are in indirect contact through an intermediate medium. Furthermore, the first feature being "above" or "on" the second feature refers to that the first feature is exactly above or obliquely above the second feature, or only refers to that the first feature has a higher horizontal height than the second feature. The first feature being "under" or "below" the second feature refers to that the first feature is exactly under or obliquely below the second feature, or only refers to that the first feature has a smaller horizontal height than the second feature.

As shown in FIGS. 1 to 8, the present disclosure provides a curtain motor, which comprises a housing 1. A motor core 2, a speed reducer 3 and a circuit board 4 are disposed in the housing 1. The motor core 2 is fixedly connected to the speed reducer 3, and also electrically connected to the circuit board 4. A through hole 1.3 used for an output end 3.1 of the speed reducer 3 to transmit power is opened at an end of the housing 1. A support 1.4 in communication with the through hole 1.3 is integrally formed inside this end of the housing 1. The support 1.4 is connected with the output end 3.1 of the speed reducer 3 to provide stabilization and supporting effect for the output end 3.1 of the speed reducer 3 so as to ensure the output end 3.1 can output power stably. A bracket 5 is further disposed in the housing 1. One end of the bracket 5 is connected to the motor core 2 and the other end is connected with the circuit board 4, and thus the motor core 2 and the circuit board 4 can be fixed inside the housing 1, saving the operation of fixing them with screws.

In the present disclosure, the support 1.4 and the housing 1 are integrally formed, that is, the two parts are combined into one part, reducing the assembling work of the parts and improving the assembling efficiency without losing any parts. In addition, the integrally-formed structure is sturdier than the assembled structure and the integrity of the parts will be better. In this way, the assembling steps can be reduced, and abnormal sound generated by unstable assembling between the parts can be avoided. In this case, the entire use of the curtain motor can be improved and the power output of the curtain motor can be stabilized. Furthermore, when the motor core 2 and the circuit board 4 are assembled by the bracket 5, the step of screwing with auxiliary tools can be saved, reducing the time and labor, increasing the assembling efficiency and lowering the production costs.

Figure 2:
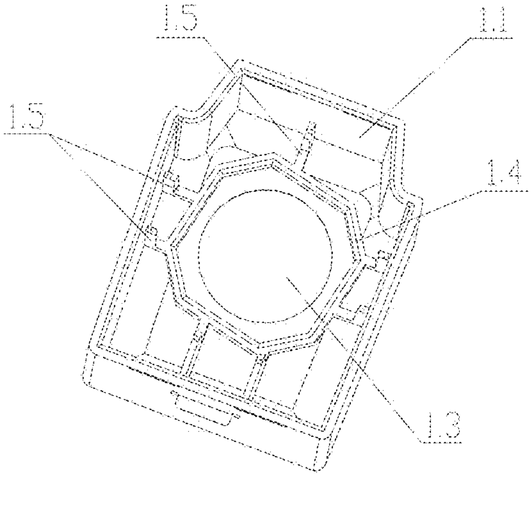
FIG. 2 is a schematic diagram illustrating an internal structure of a front housing according to the present disclosure.

The housing 1 comprises a front housing 1.1 and a rear cover 1.2. The rear cover 1.2 is fitted to the front housing 1.1. The housing 1 adopts a detachable assembling structure of the front housing 1.1 and the rear cover 1.2, which facilitates the assembling and repair of the parts in the housing 1. The fitting structure makes the assembling process convenient and quick and also saves the step of screw fixing, thereby reducing the time, labor and costs, decreasing the entire weight and lowering the transportation costs. Preferably, catches are disposed on the rear cover 1.2 and catching mouths fitted with the catches are disposed on the front housing 1.1. Therefore, the rear cover 1.2 can be quickly and fixedly connected to the front housing 1.1 by fitting catches to the catching mouths. One part of the bracket 5 is located in the front housing 1.1 and the other part is located in the rear cover 1.2. The through hole 1.3 is located at an end of the front housing 1.1 away from the rear cover 1.2. Reinforcing ribs 1.5 integrally formed with the support 1.4 are disposed at an inner side of the end of the front housing 1.1 away from the rear cover 1.2. As shown in FIG. 2, the reinforcing ribs 1.5 are disposed along a periphery of the support 1.4. The disposal of the reinforcing ribs 1.5 can provide reinforcing effect to the support 1.4 to prevent the support 1.4 from deforming and hence affecting power output.

Figure 3:
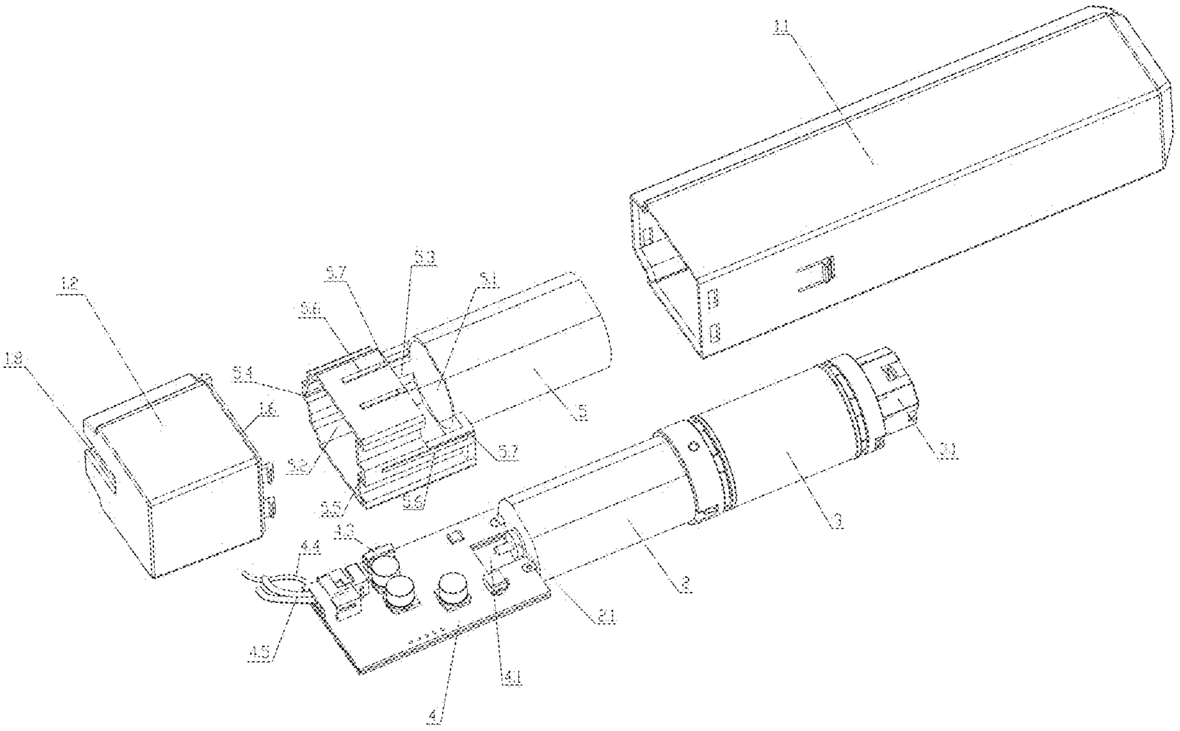
FIG. 3 is an exploded schematic diagram of the present disclosure.
Figure 4:
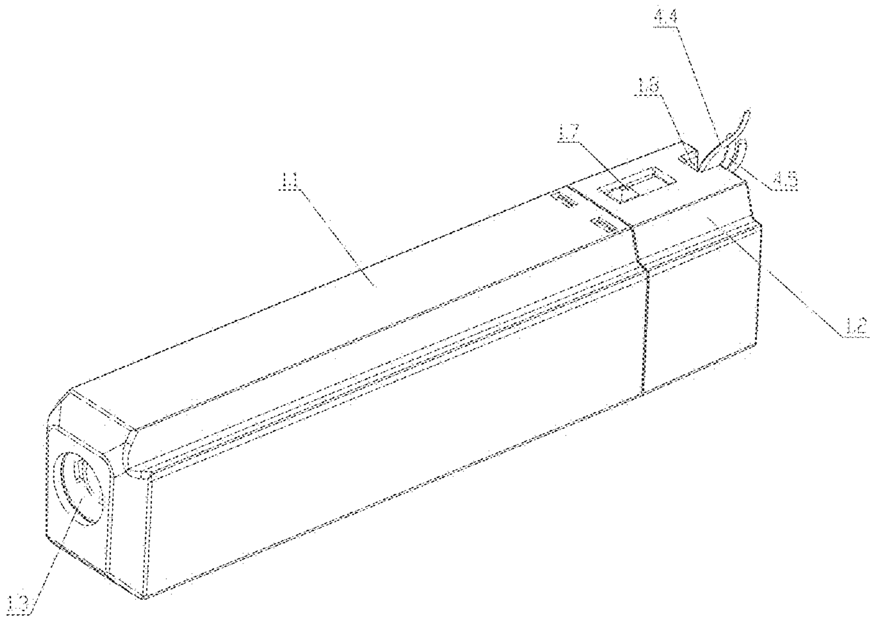
FIG. 4 is a structural schematic diagram of the present disclosure.
Figure 5:
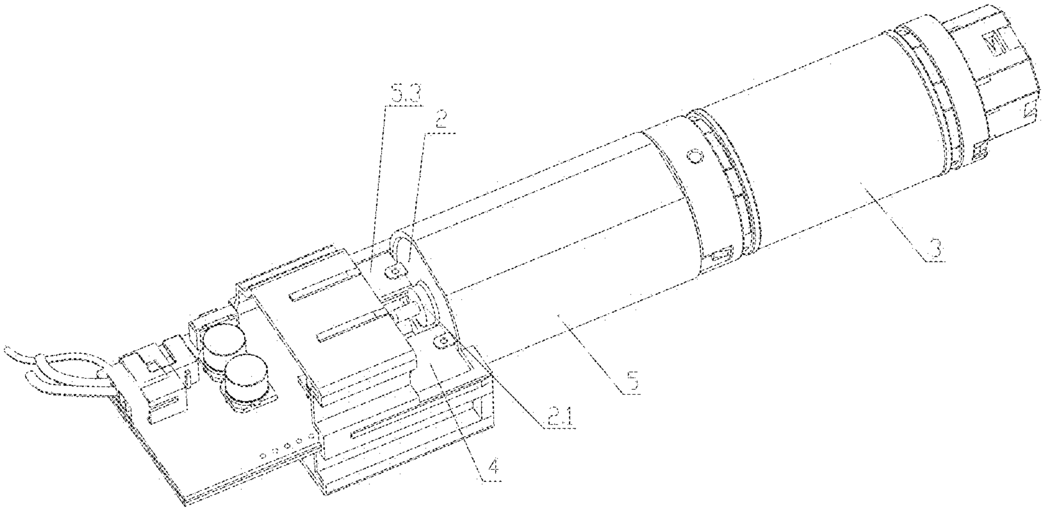
FIG. 5 is a structural schematic diagram of the present disclosure without a housing.

As shown in FIGS. 3 and 5, a first chamber 5.1 for mounting the motor core 2 and a second chamber 5.2 for mounting the circuit board 4 are disposed on the bracket 5. The first chamber 5.1 is in communication with the second chamber 5.2. A window 5.3 is opened between the first chamber 5.1 and the second chamber 5.2 on the bracket 5 to facilitate observation and repair of the circuit board 4 in the bracket 5 and help weld the negative and positive poles of the motor core 2 to the circuit board 4. Furthermore, with the disposal of the first chamber 5.1 and the second chamber 5.2, the motor core 2 and the circuit board 4 can be separately mounted, reducing mutual interference, fixing the motor core 2 and the circuit board 4 well, and avoiding displacement. In this way, the entire structure of the curtain motor is made more compact and more stable.

With reference to FIGS. 3 and 5, the first chamber 5.1 matches in shape with the motor core 2 such that the motor core 2 can be exactly assembled into the first chamber 5.1, preventing any displacement and effectively avoiding abnormal sound generated by the operation vibration of the motor core 2. A first fitting groove 5.4 and a second fitting groove 5.5 are symmetrically disposed in the second chamber 5.2 to insert the circuit board 4. A maximal width of the second chamber 5.2 is greater than a maximal width of the first chamber 5.1, such that the circuit board 4 can be inserted into the second chamber 5.2 while an insertion end of the circuit board 4 is held between the first chamber 5.1 and the second chamber 5.2, preventing it from excessively penetrating inside and thus achieving axial limitation effect.

Figure 7:
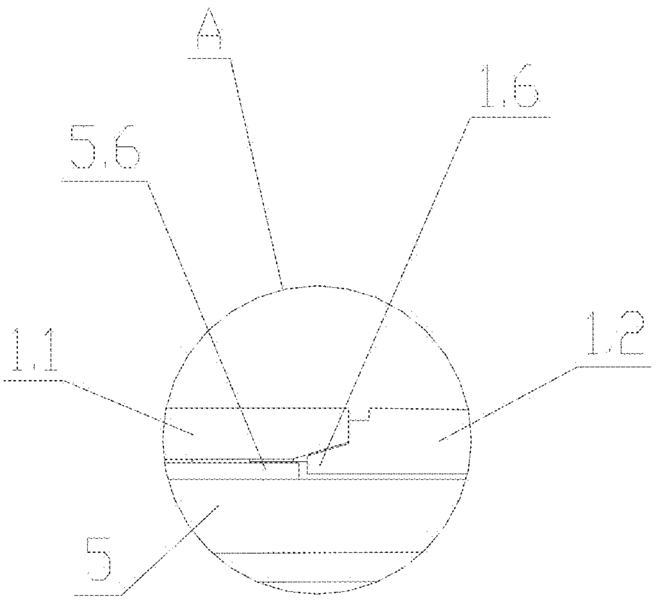
FIG. 7 is an enlarged view of the position A in FIG. 1.
Figure 8:
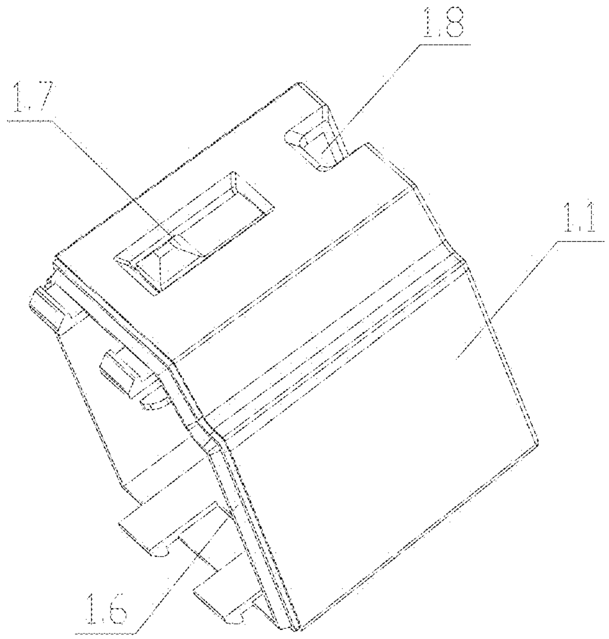
FIG. 8 is a structural schematic diagram illustrating a rear cover according to the present disclosure.

With reference to FIGS. 1, 3 and 7, at least one positioning rib 5.6 is disposed on each of four outer surfaces of the second chamber 5.2 on the bracket 5. The positioning ribs 5.6 are disposed along a length direction of the bracket 5. When the bracket 5 is assembled in the housing 1, the positioning ribs 5.6 can be abutted against an inner surface of the housing 1, achieving abutting and limiting effect. In this way, the four surfaces, i.e. the upper, lower, left and right surfaces, of the bracket 5 can be tightly against the housing 1 and therefore the bracket 5 can be prevented from radially displacing due to presence of a clearance between the bracket 5 and the housing 1 after being assembled in the housing 1, thereby avoiding abnormal sound and realizing better stability. Preferably, two positioning ribs 5.6 are disposed respectively on an outer top surface and an outer bottom surface of the second chamber 5.2, and one positioning rib 5.6 is disposed respectively on the outer side surfaces of the second chamber 5.2. In this case, the bracket 5 is in close contact with the inner wall of the housing 1, which avoids radial movement of the bracket 5. An inclined guide surface 5.7 is disposed at an end of the positioning ribs 5.6 close to the first chamber 5.1 to achieve the assembling guide effect.

One circular step surface 1.6 is disposed at a position of the rear cover 1.2 connected with the front housing 1.1. An outer circumferential surface of the step surface 1.6 is attached to an inner circumferential surface of the front housing 1.1. The disposal of the step surface 1.6 can not only achieve auxiliary positioning effect to help subsequent docking between the rear cover 1.2 and the front housing 1.1 but also realize waterproof and dustproof effect. With reference to FIG. 7, an end of the step surface 1.6 is abutted against an end of the positioning ribs 5.6 away from the first chamber 5.1, so as to achieve axial limitation effect on the bracket 5 and avoiding the axial movement of the bracket 5 toward the rear cover 1.2.

With reference to FIGS. 1 and 5, an end of the first chamber 5.1 away from the second chamber 5.2 is abutted against a connection position of the motor core 2 and the speed reducer 3, and an end of the output end 3.1 of the speed reducer 3 is abutted against an inner side of an end of the front housing 1.1 away from the rear cover 1.2, so as to achieve axial limitation effect on the bracket 5 and avoid axial movement of the bracket 5 toward the front housing 1.1.

With reference to FIGS. 1, 3 and 5, a front end of the circuit board 4 is inserted into the second chamber 5.2 and welded to the positive and negative poles of the tail end of the motor core 2; the front end of the circuit board 4 is abutted against a connection position between the second chamber 5.2 and the first chamber 5.1; a tail end of the circuit board 4 is abutted against an inner side of an end of the rear cover 1.2 away from the front housing 1.1. In this way, axial limitation is achieved for the circuit board 4 and axial movement of the circuit board 4 is avoided. Moreover, the cooperative limiting structure saves the step of fixing with screws, making the structure simpler, the parts fewer and the assembling more convenient.

Figure 6:
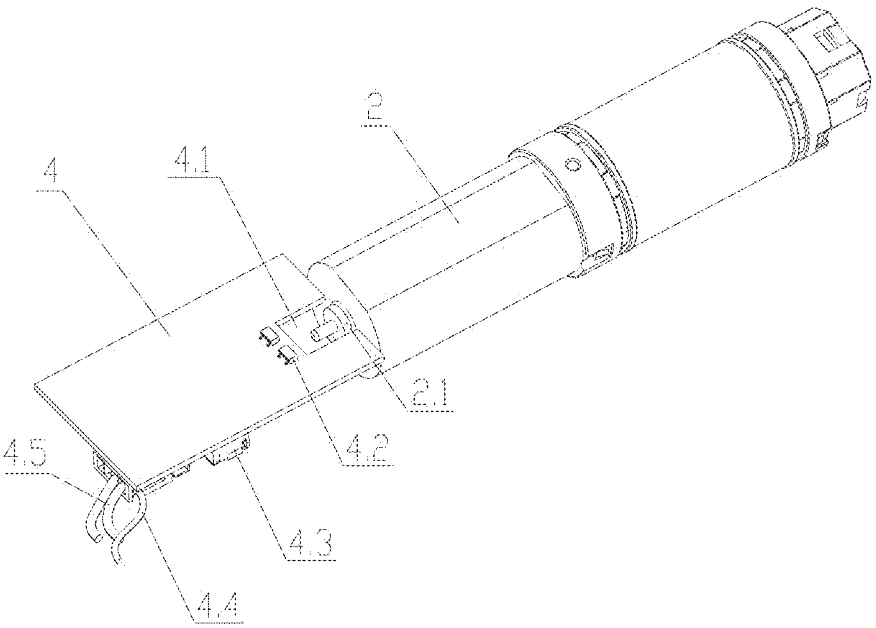
FIG. 6 is a structural schematic diagram illustrating cooperation of a circuit board and a motor core according to the present disclosure.

With reference to FIGS. 3, 5 and 6, a signal magnet 2.1 is disposed at the tail end of the motor core 2 and located between the positive and negative poles; a notch 4.1 for avoiding the signal magnet 2.1 is disposed at the front end of the circuit board 4, and a Hall sensor is disposed close to the signal magnet 2.1 at the front end of the circuit board 4. This structure disposal saves the disposal of a Hall circuit board at the tail end of the motor core 2 but combines the Hall circuit board and the circuit board 4 together, reducing the assembling work of the parts and making the structure simpler and the costs lower.

With reference to FIGS. 3 to 6 and 8, a press key 1.7 and a line-running hole 1.8 are disposed on the rear cover 1.2; a setting key 4.3 corresponding to the press key 1.7 and an antenna 4.4 and a power line 4.5 both corresponding to the line-running hole 1.8 are disposed on the circuit board 4; the press key 1.7 is located on the top surface of the rear cover 1.2, and the line-running hole 1.8 penetrates through the top surface and the end surface of the rear cover 1.2. Since the line-running hole 1.8 involves two surfaces, the antenna 4.4 and the power line 4.5 can run though a same hole and out of it in different directions, avoiding mutual interference.

During assembling process, the motor core 2 is fixedly connected to the speed reducer 3, and the motor core 2 is mounted into the first chamber 5.1 of the bracket 5 to enable an end of the first chamber 5.1 away from the second chamber 5.2 to be abutted against the connection position between the motor core 2 and the speed reducer 3. At this time, the positive and negative poles at the tail end of the motor core 2 are exposed at the window 5.3, and the circuit board 4 is inserted along the first fitting groove 5.4 and the second fitting groove 5.5 into the second chamber 5.2 to enable the front end of the circuit board 4 to be abutted against the connection position between the second chamber 5.2 and the first chamber 5.1. Then, the positive and negative poles of the motor core 2 are welded to the circuit board 4 through the window 5.3. Then, the assembled bracket 5, motor core 2, speed reducer 3 and circuit board 4 are put into the front housing 1.1 together, such that the output end 3.1 of the speed reducer 3 corresponds to the through hole 1.3 and is connected with the support 1.4 in an insertion way. Thus, the support 1.4 supports and limits the output end 3.1 of the speed reducer 3, ensuring stable power output. Next, the rear cover 1.2 is fitted to the front housing 1.1 to form a closed housing 1 so as to assemble the motor core 2, the speed reducer 3, the circuit board 4 and the bracket 5 inside the housing 1. After the rear cover 1.2 and the front housing 1.1 are fitted together, an inner side of an end away from the front housing 1.1 inside the rear cover 1.2 is abutted against the tail end of the circuit board 4; an end of the step surface 1.6 on the rear cover 1.2 is abutted against an end of the positioning ribs 5.6; an inner side of an end of the front housing 1.1 away from the rear cover 1.2 is abutted against the output end 3.1 of the speed reducer 3; the connection position between the speed reducer 3 and the motor core 2 is abutted against an end of the first chamber 5.1 on the bracket 5. In this case, the motor core 2, the speed reducer 3, the circuit board 4 and the bracket 5 are stably mounted inside the housing 1. By the abutting cooperation of various parts, axial and radial limitation can be achieved so as to avoid free movement and abnormal sound. Without fixing with screws, quick and stable assembling can be carried out, making the assembling process simple and convenient. The support 1.4 and the housing 1 are integrally formed to combine two parts into one, reducing the number of the assembled parts and improving the assembling efficiency without losing any parts. In addition, the integrally-formed structure is sturdier than the assembled structure and the integrity of the parts will be better. In this way, the assembling steps can be reduced, and abnormal sound generated by unstable assembling between the parts can be avoided. In this case, the entire use of the curtain motor can be improved and the power output of the curtain motor can be stabilized. Furthermore, the circuit board 4 combines a master control board, a Hall circuit board and a PCB board, reducing the number of the parts, and making the assembling work more convenient and the costs lower. The existing master control board is used to control the operation of the motor, the PCB board on which an antenna is generally mounted to receive signals is usually disposed at an end of the motor, and the Hall circuit board is generally mounted at the tail end of the motor core and electrically connected with the master control board by an electric line. In the present disclosure, the master control board, the Hall circuit board and the PCB board are combined into the circuit board 4, making the structure smaller, and the assembling quicker. Further, the line-running hole 1.8 on the rear cover 1.2 penetrates through the top surface and the end surface of the rear cover 1.2. Since the line-running hole 1.8 penetrates through two surfaces, the antenna 4.4 and the power line 4.5 can run though a same hole and out of it in different directions, for example, the antenna 4.4 runs out of the top surface and the power line 4.5 runs out of the end surface. In this way, mutual interference can be avoided.

The materials, reagents and experimental instruments involved in the embodiments of the present disclosure are all commercially-available products in the curtain field, unless otherwise stated.

Finally, it is to be pointed out that the above embodiments are merely used to describe the technical solution of the present disclosure rather than limit the present disclosure. Although detailed descriptions are made to the present disclosure by referring to the preceding embodiments, those skilled in the art should understand that the technical solutions recorded in the above embodiments may be modified or part of technical features thereof may be equivalently substituted. Such modifications or substitutions will not cause the essences of the corresponding technical solutions to depart from the spirits and scopes of the technical solutions of various embodiments of the present disclosure.

The invention claimed is:

1. A curtain motor, comprising a housing and a motor core, a speed reducer and a circuit board are disposed in the housing; the motor core is fixedly connected to the speed reducer, and also electrically connected to the circuit board, wherein a through hole used for an output end of the speed reducer to transmit power is opened at an end of the housing; a support in communication with the through hole is integrally formed inside this end of the housing; the support is connected with the output end of the speed reducer; a bracket is further disposed in the housing, and one end of the bracket is connected with the motor core and the other end is connected with the circuit board, wherein the housing comprises a front housing and a rear cover; the rear cover is fitted to the front housing; one part of the bracket is located in the front housing and the other part is located in the rear cover; the through hole is located at an end of the front housing away from the rear cover; reinforcing ribs integrally formed with the support are disposed at an inner side of the end of the front housing away from the rear cover; the reinforcing ribs are disposed along a periphery of the support.

2. The curtain motor of claim 1, wherein a first chamber for mounting the motor core and a second chamber for mounting the circuit board are disposed on the bracket; the first chamber is in communication with the second chamber; a window is opened between the first chamber and the second chamber on the bracket.

3. The curtain motor of claim 2, wherein the first chamber matches in shape with the motor core; a first fitting groove and a second fitting groove are symmetrically disposed in the second chamber to insert the circuit board; a maximal width of the second chamber is greater than a maximal width of the first chamber.

4. The curtain motor of claim 3, wherein a front end of the circuit board is inserted into the second chamber and welded to the positive and negative poles of the tail end of the motor core; the front end of the circuit board is abutted against a connection position between the second chamber and the first chamber; a tail end of the circuit board is abutted against an inner side of an end of the rear cover away from the front housing.

5. The curtain motor of claim 4, wherein a signal magnet is disposed at the tail end of the motor core and located between the positive and negative poles; a notch for avoiding the signal magnet is disposed at the front end of the circuit board, and a Hall sensor is disposed close to the signal magnet at the front end of the circuit board.

6. The curtain motor of claim 2, wherein at least one positioning rib is disposed on each of four outer surfaces of the second chamber on the bracket; the positioning ribs are disposed along a length direction of the bracket; an inclined guide surface is disposed at an end of the positioning ribs close to the first chamber.

7. The curtain motor of claim 6, wherein one circular step surface is disposed at a position of the rear cover connected with the front housing; an outer circumferential surface of the step surface is attached to an inner circumferential surface of the front housing; an end of the step surface is abutted against an end of the positioning ribs away from the first chamber.

8. The curtain motor of claim 2, wherein an end of the first chamber away from the second chamber is abutted against a connection position of the motor core and the speed reducer, and an end of the output end of the speed reducer is abutted against an inner side of an end of the front housing away from the rear cover.

9. The curtain motor of claim 1, wherein a press key and a line-running hole are disposed on the rear cover; a setting key corresponding to the press key and an antenna and a power line both corresponding to the line-running hole are disposed on the circuit board; the press key is located on the top surface of the rear cover, and the line-running hole penetrates through the top surface and the end surface of the rear cover.

* * * * *